United States Patent
Ito et al.

(10) Patent No.: US 10,048,728 B2
(45) Date of Patent: Aug. 14, 2018

(54) INFORMATION PROCESSING APPARATUS, METHOD, AND STORAGE MEDIUM

(71) Applicant: CANON KABUSHIKI KAISHA, Tokyo (JP)

(72) Inventors: Hikaru Ito, Tokyo (JP); Seiko Kono, Kawasaki (JP); Takeshi Yamazaki, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 830 days.

(21) Appl. No.: 14/569,462

(22) Filed: Dec. 12, 2014

(65) Prior Publication Data

US 2015/0169125 A1    Jun. 18, 2015

(30) Foreign Application Priority Data

Dec. 18, 2013    (JP) .................................. 2013-261506

(51) Int. Cl.
   *G06F 1/16*      (2006.01)
   *G06F 3/0488*   (2013.01)
   *G06F 3/0487*   (2013.01)

(52) U.S. Cl.
   CPC .......... *G06F 1/1694* (2013.01); *G06F 3/0487* (2013.01); *G06F 3/0488* (2013.01); *G06F 2203/04808* (2013.01)

(58) Field of Classification Search
   None
   See application file for complete search history.

(56) References Cited

U.S. PATENT DOCUMENTS

| 2007/0152976 | A1 | 7/2007 | Townsend |
| 2011/0242029 | A1* | 10/2011 | Kasahara ................ G06F 3/016 345/173 |
| 2012/0113061 | A1* | 5/2012 | Ikeda ...................... G06F 3/041 345/175 |

FOREIGN PATENT DOCUMENTS

| JP | 2011-150738 A | 8/2011 |
| JP | 2011-164746 A | 8/2011 |
| JP | 2012-014022 A | 1/2012 |
| JP | 2013-122625 A | 6/2013 |
| JP | 2013-161221 A | 8/2013 |
| WO | 2011/101940 A1 | 8/2011 |

* cited by examiner

*Primary Examiner* — David D Davis
(74) *Attorney, Agent, or Firm* — Canon U.S.A., Inc. IP Division

(57) ABSTRACT

An information processing apparatus, which recognizes an operation input using a pointed position, includes a position acquisition unit configured to acquire at least one pointed position pointed on a display screen; a pressure acquisition unit configured to acquire information related to pressure corresponding to each pointed position, acquired by the position acquisition unit; and a recognition unit configured to, in a case where a plurality of pointed positions pointed on the display screen exist at a same point-in-time, use a pointed position of the plurality of pointed positions excluding a pointed position regarding which a decision is made based on information relating to pressure acquired by the pressure acquisition unit that the pointed position does not make up input used for an operation of the information processing apparatus, recognize the operation.

11 Claims, 11 Drawing Sheets

| ID | X (dot) | Y (dot) | Time (ms) | NEWEST FLAG | CONTACT PRESSURE | PRESSURE CHANGE | ANGLE (DEGREE) | INVALID FLAG |
|---|---|---|---|---|---|---|---|---|
| 1 | 50 | 320 | 0 | TRUE | 900 | 0 | 60 | FALSE |

701

| ID | X (dot) | Y (dot) | Time (ms) | NEWEST FLAG | CONTACT PRESSURE | PRESSURE CHANGE | ANGLE (DEGREE) | INVALID FLAG |
|---|---|---|---|---|---|---|---|---|
| 1 | 50 | 320 | 1000 | FALSE | 880 | 20 | 60 | FALSE |

702

| ID | X (dot) | Y (dot) | Time (ms) | NEWEST FLAG | CONTACT PRESSURE | PRESSURE CHANGE | ANGLE (DEGREE) | INVALID FLAG |
|---|---|---|---|---|---|---|---|---|
| 1 | 50 | 320 | 1000 | FALSE | 880 | 20 | 60 | TRUE |
| 2 | 430 | 100 | 1010 | TRUE | 700 | 0 | 60 | FALSE |

703

| ID | X (dot) | Y (dot) | Time (ms) | NEWEST FLAG | CONTACT PRESSURE | PRESSURE CHANGE | ANGLE (DEGREE) | INVALID FLAG |
|---|---|---|---|---|---|---|---|---|
| 1 | 50 | 320 | 2000 | FALSE | 850 | 30 | 60 | TRUE |
| 2 | 430 | 100 | 1010 | TRUE | 700 | 0 | 60 | FALSE |

704

| ID | X (dot) | Y (dot) | Time (ms) | NEWEST FLAG | CONTACT PRESSURE | PRESSURE CHANGE | ANGLE (DEGREE) | INVALID FLAG |
|---|---|---|---|---|---|---|---|---|
| 1 | 50 | 320 | 2000 | FALSE | 850 | 30 | 60 | TRUE |
| 2 | 430 | 400 | 2010 | TRUE | 400 | 300 | 60 | FALSE |

| ID | X (dot) | Y (dot) | Time (ms) | NEWEST FLAG | CONTACT PRESSURE | PRESSURE CHANGE | ANGLE (DEGREE) | INVALID FLAG |
|---|---|---|---|---|---|---|---|---|
| 1 | 50 | 320 | 0 | TRUE | 1200 | 0 | 270 | FALSE |

801

| ID | X (dot) | Y (dot) | Time (ms) | NEWEST FLAG | CONTACT PRESSURE | PRESSURE CHANGE | ANGLE (DEGREE) | INVALID FLAG |
|---|---|---|---|---|---|---|---|---|
| 1 | 50 | 320 | 1000 | FALSE | 1140 | 60 | 270 | FALSE |

802

| ID | X (dot) | Y (dot) | Time (ms) | NEWEST FLAG | CONTACT PRESSURE | PRESSURE CHANGE | ANGLE (DEGREE) | INVALID FLAG |
|---|---|---|---|---|---|---|---|---|
| 1 | 50 | 320 | 1000 | FALSE | 1140 | 60 | 270 | TRUE |
| 2 | 430 | 100 | 1010 | TRUE | 650 | 0 | 270 | FALSE |

803

| ID | X (dot) | Y (dot) | Time (ms) | NEWEST FLAG | CONTACT PRESSURE | PRESSURE CHANGE | ANGLE (DEGREE) | INVALID FLAG |
|---|---|---|---|---|---|---|---|---|
| 1 | 50 | 320 | 2000 | FALSE | 1300 | 160 | 270 | TRUE |
| 2 | 430 | 100 | 1010 | TRUE | 650 | 0 | 270 | FALSE |

804

| ID | X (dot) | Y (dot) | Time (ms) | NEWEST FLAG | CONTACT PRESSURE | PRESSURE CHANGE | ANGLE (DEGREE) | INVALID FLAG |
|---|---|---|---|---|---|---|---|---|
| 1 | 50 | 320 | 2000 | FALSE | 1300 | 160 | 270 | TRUE |
| 2 | 430 | 400 | 2010 | TRUE | 350 | 300 | 270 | FALSE |

| ID | X (dot) | Y (dot) | Time (ms) | NEWEST FLAG | CONTACT PRESSURE | PRESSURE DIFFERENCE | INVALID FLAG |
|---|---|---|---|---|---|---|---|
| 1 | 50 | 320 | 0 | TRUE | 1200 | – | FALSE |

1001

| ID | X (dot) | Y (dot) | Time (ms) | NEWEST FLAG | CONTACT PRESSURE | PRESSURE DIFFERENCE | INVALID FLAG |
|---|---|---|---|---|---|---|---|
| 1 | 50 | 320 | 1000 | FALSE | 1150 | – | FALSE |

1002

| ID | X (dot) | Y (dot) | Time (ms) | NEWEST FLAG | CONTACT PRESSURE | PRESSURE DIFFERENCE | INVALID FLAG |
|---|---|---|---|---|---|---|---|
| 1 | 50 | 320 | 1000 | FALSE | 1150 | 450 | TRUE |
| 2 | 430 | 100 | 1010 | TRUE | 700 | – | FALSE |

1003

| ID | X (dot) | Y (dot) | Time (ms) | NEWEST FLAG | CONTACT PRESSURE | PRESSURE DIFFERENCE | INVALID FLAG |
|---|---|---|---|---|---|---|---|
| 1 | 50 | 320 | 2000 | FALSE | 1300 | 600 | TRUE |
| 2 | 430 | 100 | 1010 | TRUE | 700 | – | FALSE |

1004

| ID | X (dot) | Y (dot) | Time (ms) | NEWEST FLAG | CONTACT PRESSURE | PRESSURE DIFFERENCE | INVALID FLAG |
|---|---|---|---|---|---|---|---|
| 1 | 50 | 320 | 2000 | FALSE | 1300 | 900 | TRUE |
| 2 | 430 | 400 | 2010 | TRUE | 400 | – | FALSE |

… # INFORMATION PROCESSING APPARATUS, METHOD, AND STORAGE MEDIUM

BACKGROUND OF THE INVENTION

Field of the Invention

The present disclosure generally relates to information processing and, more particularly, to an information processing apparatus, method, storage medium, and to a technology where an operation input using one or more pointed positions is recognized.

Description of the Related Art

As of recent, touch input devices have come into widespread use which, in response to a screen being touched by a finger of a user or a stylus, acquire X and Y coordinate values of the touched position, and execute various types of processing based on the input values. So-called multi-touch technology, where operations are performed by touching multiple points on the screen, are also being developed. Multiple touch operations can be used for a wide variety of operations such as enlarging or reducing size, scrolling, and so forth, by touching two points using the index finger and thumb of the right hand, for example.

Such touch input devices are often designed so that as wide an area of the entire device as possible is a screen face. Accordingly, there are cases where the user holds the touch input device in one hand to perform input with the other, for example, but unwittingly touches the screen with the hand holding the device. Touch input devices capable of multi-touch operations may recognize such an involuntary contact as another touch point, and thus erroneously recognize more touch points that the user intended. This may result in processing being executed which the user did not intend.

Japanese Patent Laid-Open No. 2011-150738 discloses detecting a pressure load from touch input, and controls whether or not to accept this touch input based on a set load reference.

However, in many touch input devices, the pressure load from touch input will vary from one user to another, and further, this pressure load will also vary depending on the inclination of the touch input device. For example, the pressure load from touch input will vary depending on the age and gender of the user. Also, if the user uses the touch input device while in a supine posture, the user will be touching the touch input device from below, so the weight of the touch input device will be added to the touch input so the pressing load is greater than normal, and also the touch tends to be unstable.

SUMMARY OF THE INVENTION

According to an aspect of the present disclosure, an information processing apparatus which recognizes an operation input using a pointed position includes a position acquisition unit configured to acquire at least one pointed position pointed on a display screen, a pressure acquisition unit configured to acquire information related to pressure corresponding to each pointed position, acquired by the position acquisition unit, and a recognition unit. In a case where a plurality of pointed positions pointed on the display screen exist at a same point-in-time, the recognition unit uses a pointed position of the plurality of pointed positions excluding a pointed position regarding which a decision is made based on information relating to pressure acquired by the pressure acquisition unit that the pointed position does not make up input used for an operation of the information processing apparatus, and recognizes the operation.

Further features of the present disclosure will become apparent from the following description of exemplary embodiments with reference to the attached drawings.

BRIEF DESCRIPTION OF THE DRAWINGS

FIGS. 1A through 1C illustrate an example of an information processing apparatus applicable to an embodiment, in which FIG. 1A illustrates an outer view, FIG. 1B illustrates a hardware configuration, and FIG. 1C illustrates a software configuration.

FIG. 7 is an example of information held relating to pointed positions.

FIG. 8 is an example of information held relating to pointed positions.

FIG. 10 is an example of information held relating to pointed positions.

DESCRIPTION OF THE EMBODIMENTS

Various exemplary embodiments, features, and aspects of the disclosure will be described in detail below with reference to the drawings.

An embodiment for carrying out the present disclosure will be described below with reference to the drawings. It should be understood that the embodiment described here is only an exemplary illustration of specifically carrying out the present disclosure, and is not restrictive.

Figure 1A:
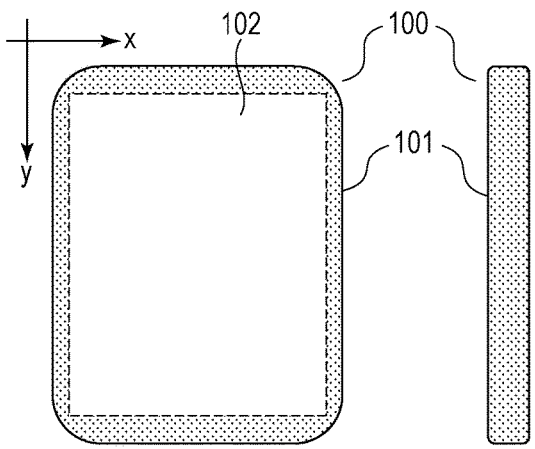
Figure 1B:
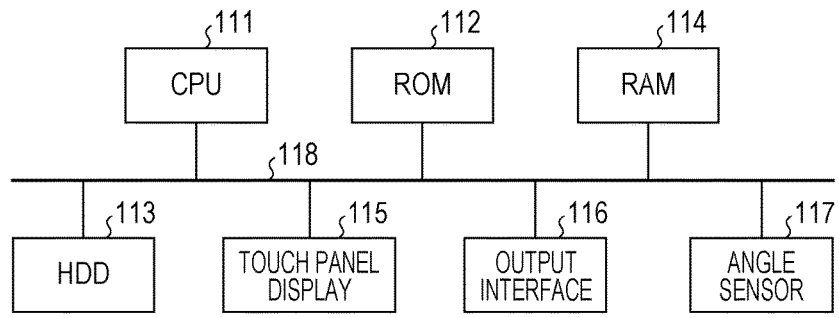
Figure 1C:
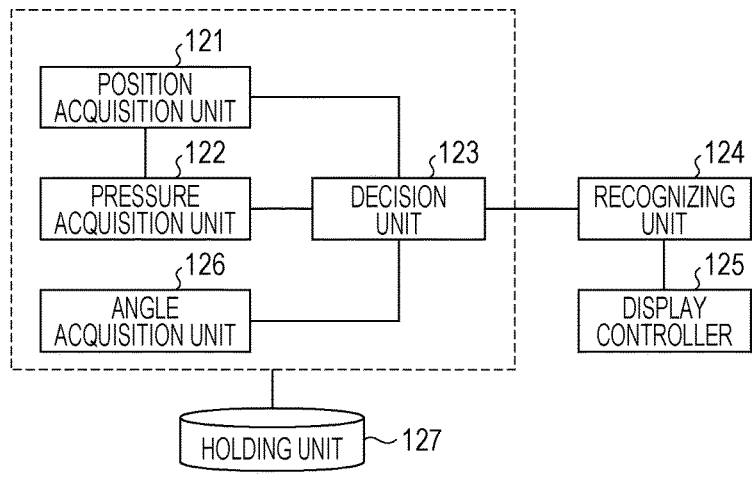

FIGS. 1A through 1C illustrate an example of an information processing apparatus applicable to an embodiment, in which FIG. 1A illustrates an outer view, FIG. 1B illustrates a hardware configuration, and FIG. 1C illustrates a software configuration.

FIG. 1A is a front view and side view of the outside of a mobile terminal, serving as an example of an information processing apparatus 100. A casing 101 formed of synthetic resin or metal or the like surrounds a contour of an input region 102 in FIG. 1A. The input region 102 is configured including a touch sensor and so forth, and serves as a region for a user to touch so as to perform operation input to the information processing apparatus 100. The input region 102 according to the present embodiment is configured as a touch panel display where a touch sensor is disposed on a display screen of a display unit. The display screen displays images to operate the information processing apparatus 100 or an apparatus connected to the information processing apparatus 100. The user normally grips a portion of the casing 101 to support the information processing apparatus 100.

The input region 102 of a touch panel display 115 of the information processing apparatus 100 which will be described here has resolution of 480 dots×640 dots, and can manage position information on a coordinates plane of which the upper left side in the drawing is the origin. The touch sensor can also acquire contact information at a pointed position, and specifically acquires contact pressure, contact area, and so forth.

The mobile terminal illustrated in FIG. 1A will hereinafter be described as being the information processing apparatus 100. FIG. 1B is a block diagram illustrating an example of the hardware configuration of the information processing apparatus 100 to which the present embodiment is applicable. The information processing apparatus 100 includes a central processing unit (CPU) 111, read-only memory (ROM) 112, and a hard disk drive (HDD) 113, as illustrated in FIG. 1B. The CPU 111 reads out and executes control programs stored in the ROM 112 and HDD 113 to control various devices in the present embodiment. The control programs are control programs to cause the information processing apparatus 100 to execute the various operations described in the embodiment. The ROM 112 holds the control programs and various types of data used by the programs. Random access memory (RAM) 114 includes a work region for the programs to be executed by the CPU 111, a save region for data in case of error processing, a load region for the control programs, and so forth. The HDD 113 stores the various control programs and various types of data. As used herein, the term "unit" generally refers to any combination of software, firmware, hardware or other component, such as circuitry, that is used to effectuate a purpose.

The touch panel display 115 is a device serving as both a touch sensor to acquire user operation information at the input region 102, and a display screen for display output. The touch panel display 115 detects a contact portion where the input region 102 has been touched by a human hand or the like, and identifies the touched position as one coordinate point on the coordinate plane defined with regard to the input region 102. In a case where the contact portion has area, the center gravity or the center coordinates of that area is identified. Hereinafter, a point identified in this way will be referred to as a pointed position. Note that a pointed position can be detected for each contact portion detected on the touch panel which can be deemed to be independent (e.g., in a case of touching with multiple fingers, each of the multiple contact portions which exist). That is to say, the touch panel display 115 is capable of so-called multi-touch detection, and can detect all of the one or more pointed positions being pointed at the same point-in-time. Examples of touch detection processes include the resistive film method, electrostatic capacitance method, infrared ray method, ultrasonic method, acoustic wave method, vibration detection method, and other such touch panel methods. Alternatively, contact with the input face may be detected using an arrangement capable of positional detection in three-dimensional space, such as a range image sensor or a stereo camera or the like, and acquire position information defined on the input face. Further, a detecting unit may be used which can detect position information of the finger of the user which is not in contact with the surface of the information processing apparatus 100 but is in proximity, and use the position in the proximal state (proximal position) as the pointed position. While the present embodiment is described as a pointed position being detected as one coordinate point, the present disclosure is not restricted thusly. For example, a contact portion having area may be deemed to be the pointed position, or alternatively, the input region 102 may be divided into an array of touch areas, and area identification information indicating which area is being touched may be taken as the pointed position. Also, the contact pressure of the pointed position is the sum of pressure detected by the pressure sensors nearby the pointed position. In the present embodiment, the maximum value of contact pressure is 1500, while the value in a non-contact state is 0. Accordingly, in a case where the detected pointed position is the above-described proximity position, the magnitude of the contact pressure at the pointed position is 0. Thus, the contact pressure value at the pointed position is a discrete value proportionate to the intensity of pressure in a range of 0 to 1500. Note that the contact pressure may be substituted by contact area instead. The stronger the finger is pressed against the touch panel surface, the greater the area in contact becomes, so this nature may be used as information representing the contact pressure.

Next, an output interface 116 is an interface to output various types of information to an output device other than the display, via network or the like. An angle sensor 117 is an acceleration sensor for example, and acquires angle information of the inclination of the information processing apparatus 100 as to the vertical direction. In a case where the inclination of the information processing apparatus 100 is not to be taken into consideration in processing for determining whether or not a detected pointed position is valid as an input making up a touch operation (hereinafter referred to as "invalid determination processing"), the angle sensor 117 may be omitted. A bus 118 transfers address signals specifying components to be controlled by the CPU 111, control signals for controlling the components, and data exchanged among the components. The aforementioned control programs may be stored in the ROM 112 or HDD 113 beforehand, or may be received from an external device or the like via network and stored in the ROM 112 or HDD 113.

FIG. 1C is block diagram illustrating an example of the software configuration of the information processing apparatus 100. A position acquisition unit 121 is configured including the CPU, ROM, and RAM (hereafter written as "CPU etc."), and acquires information relating to a pointed position which is being touched by the user on the display screen (in the input region), based on signals from the touch panel display 115. Note that this includes cases of deeming a proximity position not necessarily in a contact state to be a touched pointed position, as well. Now, even in a case where multiple pointed positions are being touched simultaneously (a multi-touched state), the touch sensor according to the present embodiment notifies the information thereof one at a time. The information regarding these touches are held in a holding unit 127 configured in the RAM 114. Information regarding the pointed positions is, for example, coordinate information indicating the pointed position within the input region 102, the point-in-time at which the pointed position was detected, and information indicating the order in which detection was made. Further, a newest flag is correlated with each pointed position. A newest flag is a flag to enable recognition of which of the one or more pointed positions was detected last. Note however, that the touch sensor according to the present embodiment periodically detects pointed positions, so pointed positions which continue to be at the same position without moving will be repeatedly detected each predetermined time interval. A pointed position regarding which the newest flag has been set to "TRUE" represents the pointed position which the user has touched last with the finger, not simply the pointed position which the touch sensor has detected last. Accordingly, if the finger which has made the touch remains at that position, the newest flag of the pointed position repeatedly detected at the same position is no longer "TRUE". The pointed position which has the "TRUE" newest flag is the pointed position where a user finger has moved to last. Accordingly, in the present embodiment the newest flag of a pointed position detected at the same position after having moved is no longer "TRUE".

That is to say, in a case where multiple pointed positions are pointed to at the same point-in-time, the newest flag of the pointed position which the touch sensor has detected last is set to "TRUE". In a case where the touch sensor has started detection of pointed positions a predetermined time period layer, the newest flag of the pointed position which has not moved from the previous position is changed to "FALSE". On the other hand, in a case where motion of a finger is detected, the newest flag of the pointed position by that finger is set to "TRUE", regardless of the order of detection by the touch sensor. At the time of holding the information for each pointed position in the holding unit 127, the position acquisition unit 121 correlates a newly detected pointed position or moved pointed position with the newest flag "TRUE", and all other with the newest flag "FALSE".

A pressure acquisition unit 122 is configured including the CPU etc., and acquires contact pressure corresponding to each pointed position which the position acquisition unit 121 has acquired, based on signals from the touch sensor of the touch panel display 115, and holds the acquired contact pressure in the holding unit 127. The pressure acquisition unit 122 further acquires and saves pressure change, which represents the temporal change of contact pressure, or information representing pressure difference, which is relative pressure difference between pointed positions. The pressure change can be calculated by

|contact pressure value detected this time−contact pressure value last time|=pressure change when updating the contact pressure value in the present embodiment. The pressure difference can be calculated by

|contact pressure value detected this time−contact pressure value where newest flag is "TRUE"|=pressure difference when updating the contact pressure value. If there is no pointed position where the newest flag is "TRUE", the calculating processing is not executed.

An angle acquisition unit 126 is configured including the CPU etc., and holds information indicating the inclination of the information processing apparatus 100 periodically obtained from the angle sensor 117 in the holding unit 127. The holding unit 127 holds information correlating to each pointed position is the present embodiment, and angle information which the angle acquisition unit 126 has acquired at the point-in-time of detection of a pointed position is correlated with that pointed position. In a case of not taking the inclination of the information processing apparatus 100 into consideration in the processing for deciding whether or not the pointed position is invalid, the angle acquisition unit 126 may be omitted.

A decision unit 123 is configured including the CPU etc., and performs various types of decision processing relating to the pointed positions detected by the position acquisition unit 121, based on the information held in the holding unit 127. In the present embodiment, whether a pointed position regarding which coordinate information has been acquired by the position acquisition unit 121 is to be valid or invalid as an input making up the touch information, is decided. A value for an invalid flag is correlated with and held in the holding unit 127 for each pointed position in the present embodiment. The initial value for an invalid flag is "FALSE", and the decision unit 123 changes the value of the invalid flag in accordance with the results of the decision processing. A pointed position where the invalid flag is "TRUE" is not recognized as an operation.

A recognizing unit 124 is configured including the CPU etc. Upon having received a decision result from the decision unit 123, the recognizing unit 124 acquires information relating a pointed position which has been decided by the decision unit 123 to be valid (not invalid) from that held in the holding unit 127, and recognizes this information as input information making up the touch operation. That is to say, pointed positions which have been decided to be invalid (not valid) by the decision unit 123 are deleted from being pointed positions recognized as input used for the touch operation.

A display controller 125 is configured including the CPU etc. The display controller 125 references the holding unit 127 and controls the displayed image so as to correlate to the touch operation recognized by the recognizing unit 124.

In the present embodiment, these functional units are realized by the CPU 111 loading the programs stored in the ROM 112 to the RAM 114 and executing the programs. Note however, that these functional units may be realized in the same way by an information processing apparatus which using hardware instead. In this case, computation units and circuits will be configured corresponding to the processing of each functional unit described here.

Next, the flow of recognition processing of a touch input by the user will be described with reference to the flowchart in FIG. 2. Note that in the present embodiment, the following processing is started in response to the user having turned on the power supply to the information processing apparatus 100. However, the present disclosure is not restricted to this arrangement, and processing to recognize the touch input may be started in response to the apparatus being unlocked, or a particular application having been activated, or rendering of a displayed image being completed.

Figure 3:
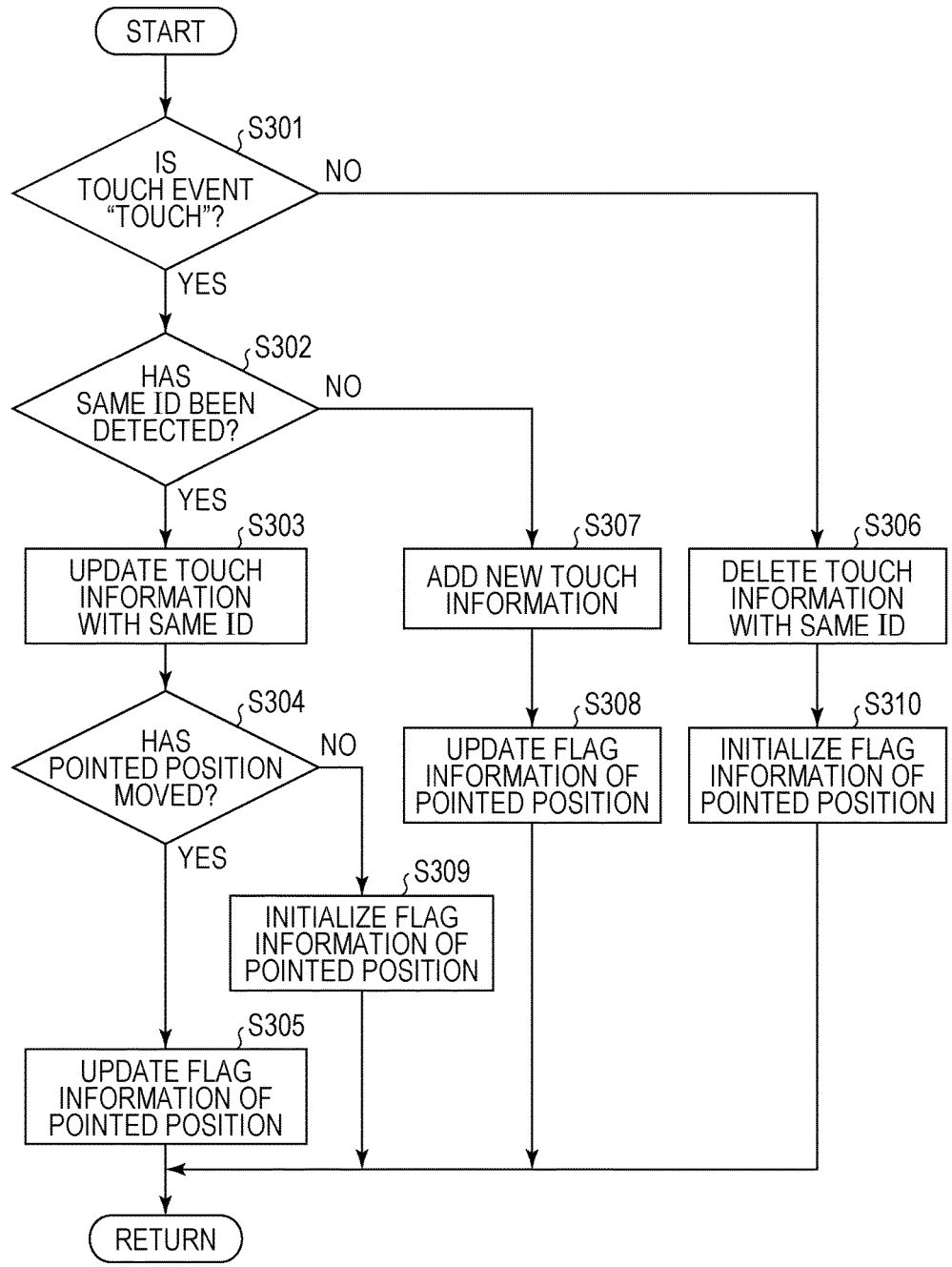
FIG. 3 is a flowchart illustrating an example of a flow of pointed position detection processing.

First, in step S201, the position acquisition unit 121 and pressure acquisition unit 122 acquire information relating to pointed positions on the input region 102, based on signals from the touch panel display 115. The position acquisition unit 121 acquires information relating to coordinates of pointed positions and the detected point-in-time, based on information obtained from the touch sensor, and holds this in the holding unit 127. The pressure acquisition unit 122 acquires the magnitude of the contact pressure corresponding to each pointed position, and holds this in the holding unit 127. A detailed flow of the pointed position detection processing executed in step S201 is illustrated in FIG. 3.

First, in step S301, the position acquisition unit 121 decides whether or not a touch event notified from the touch sensor is "TOUCH". A touch event is notified from the touch sensor used in the present event when the input region 102 detects a touch, or release of a detected touch. In a case where the input region 102 detects a touch, "TOUCH" is notified as a touch event. In a case where the input region 102 detects releasing of a detected touch, "RELEASE" is notified as a touch event. The position acquisition unit 121 acquires the touch event, the coordinate information of the pointed position, and the point-in-time of detection. At the same time, the pressure acquisition unit 122 acquires the magnitude of contact force corresponding to the pointed position. In a case where the position acquisition unit 121 decides that the notified touch event is "TOUCH" (YES in step S301), the flow advances to step S302. If determination is made that the notified touch event is not "TOUCH", i.e., is "RELEASE" (NO in step S301), the flow advances to step S306.

In step S302, the position acquisition unit 121 decides whether or not a pointed position having the same ID as that regarding which "TOUCH" has been notified has already been detected. The position acquisition unit 121 references the information held in the holding unit 127, and decides whether or not the corresponding ID is included. The ID of a pointed position is identification information of the pointed positions which the position acquisition unit 121 has detected. In the present embodiment, an identifier (ID) is assigned to each pointed position touching the input region 102 at the same point-in-time, based on the detected order, such as 1, 2, and so on. If the position acquisition unit 121 decides that a pointed position of the same ID has not been detected (NO in step S302), the flow advances to step S307. On the other hand, if the position acquisition unit 121 decides that a pointed position of the same ID has already been detected (YES in step S302), the flow advances to step S303.

In step S303, the position acquisition unit 121 updates, of the information held in the holding unit 127, the coordinates of the pointed position having the same ID as the pointed position regarding which "TOUCH" has been detected, and information of the detection point-in-time. The pressure acquisition unit 122 updates the information of magnitude of the contact pressure, and further calculates the temporal change of the contact pressure, which is then held in the holding unit 127.

In step S304, the position acquisition unit 121 decides whether or not the detected pointed position is a pointed position which has moved from the position at which it was detected before. In the present embodiment, at the time of the pointed position information being updated in step S303, the distance of movement of the pointed position is calculated from the coordinate information of the pointed position before updating, and this calculated movement distance is compared with a predetermined distance. In a case where the comparison result indicates that the movement distance of the pointed position is larger than the predetermined distance decision is made that the pointed position has moved. The predetermined distance used here is a threshold value of distance to decide whether or not the user can be judged to have moved the pointed position for a touch operation. This threshold value is set to around the magnitude of the smallest movement distance necessary for a touch operation to be recognized, registered in the information processing apparatus 100 beforehand. In a case where the detected pointed position is decided to be a moved pointed position (YES in step S304), the flow advances to step S305. On the other hand, in a case where the acquired pointed position is decided not to be a moved pointed position (NO in step S304), the flow advances to step S309.

In step S305, the position acquisition unit 121 updates the held information so as to indicate that the detected pointed position is the moved pointed position, and that this is the newest pointed position. In the present embodiment, the value "TRUE" is correlated with the newest flag for each pointed position held in the holding unit 127, indicating that the newest pointed position. The flow then returns to the processing in FIG. 2.

In a case where NO is decided in step S301, which is to say that "RELEASE", which is an event other than "TOUCH", has been notified from the touch sensor, the flow advances to step S306. In step S306, the position acquisition unit 121 deletes, of the information held in the holding unit 127, the information (coordinates, detection point-in-time, ID, contact pressure, angle, etc.) of the pointed position correlated to the ID corresponding to the pointed position regarding which the "RELEASE" has been detected. The flow then advances to step S310.

In step S310, the newest flag and invalid flag processed in step S306 are initialized. In the present embodiment, the values of the newest flag and invalid flag are set to "FALSE" as initialization processing. The flow then returns to the processing in FIG. 2.

On the other hand, in a case where NO is decided in step S302, which is to say that a new pointed position has been detected, the flow advances to step S307. In step S307, the position acquisition unit 121 adds information of the pointed position regarding which "TOUCH" has been detected, such as ID, positional coordinates, detection point-in-time, magnitude of contact pressure, angle of apparatus, and so forth, held in the holding unit 127. The information of the positional coordinates is expressed by coordinates (x, y) on the coordinate plane of which the upper left of the input region 102 is the origin, as illustrated in FIG. 1A. The flow then advances to step S308.

In step S308, the position acquisition unit 121 updates information indicating that the detected pointed position is the newest pointed position. In the present embodiment, the position acquisition unit 121 sets the newest flag of the pointed position held in the holding unit 127 in step S307 to "TRUE". The flow then returns to the processing in FIG. 2.

On the other hand, in a case where No has been decided in step S304, which is to say that a decision has been made that the detected pointed position has not moved, the flow advances to step S309. In step S309, the position acquisition unit 121 initializes the newest flag for the pointed position held in step S303. In the present embodiment, the newest flag is set to "FALSE" as initialization processing. The flow then returns to the processing in FIG. 2.

Figure 2:
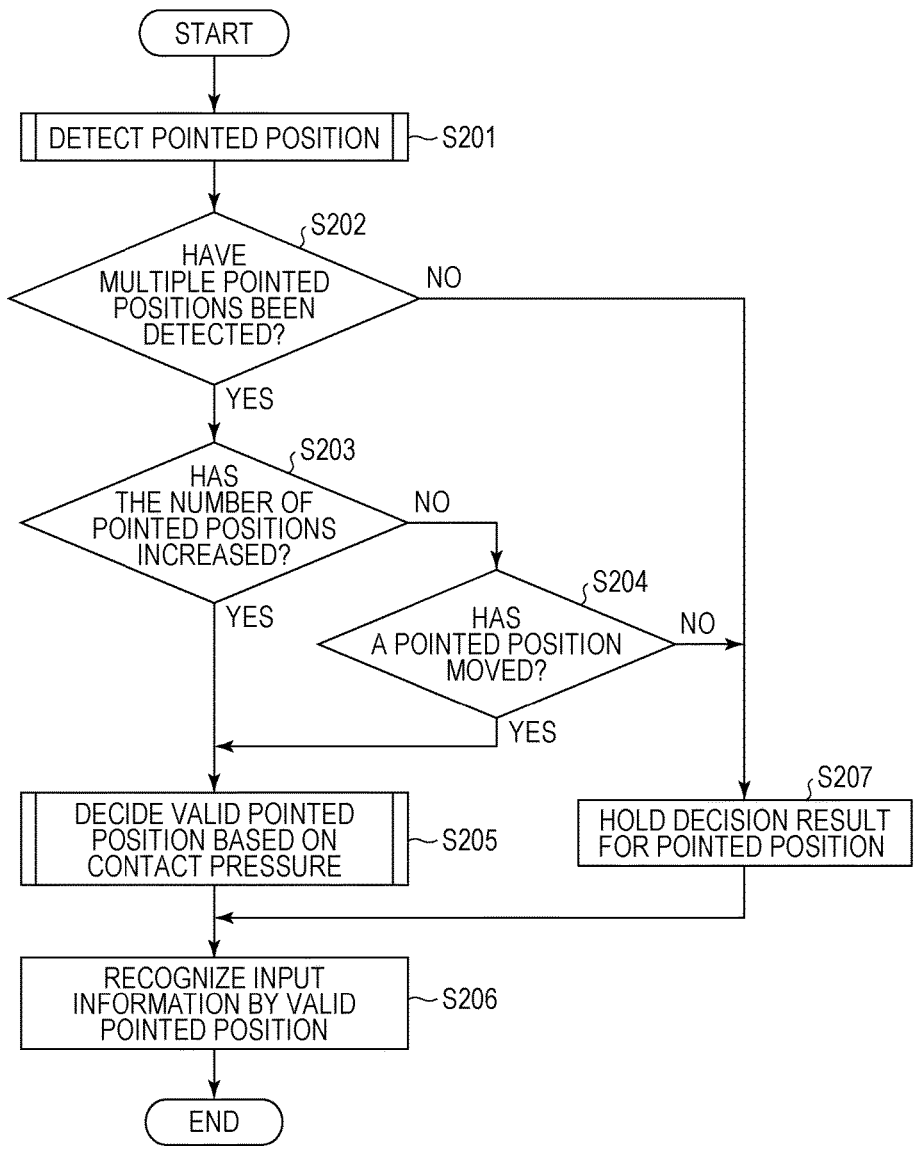
FIG. 2 is a flowchart illustrating an example of a flow of recognition processing of touch input by a user.

Upon returning to the processing in FIG. 2, in the subsequent step S202 the decision unit 123 decides whether or not the number of pointed positions detected by the position acquisition unit 121 is multiple. What is decided here is whether or not multiple pointed positions exist on the input region 102 at the same point-in-time, regardless of whether or not there has been time difference in two fingers touching the input region 102 at the same timing. That is to say, in a case where multi-touch input is being performed, a decision is made that the number of pointed positions is multiple. The decision unit 123 according to the present embodiment references the information held in the holding unit 127, obtains the number of pointed positions from the number of IDs held, and decides whether or not the number of pointed positions detected is multiple. In a case where a decision is made in step S202 that the number of pointed positions detected is multiple (YES in step S202), the flow advances to step S203. On the other hand, in a case where a decision is made in step S202 that multiple pointed positions have not been detected (No in step S202), the flow advances to step S207.

In steps S203 and S204, the decision unit 123 decides whether the number of pointed positions has increased, or a pointed position has moved. The decision unit 123 references the newest flag correlated with the pointed position detected this time that is held in the holding unit 127. In a case where the newest flag is "TRUE", the decision unit 123 decides that either the number of pointed positions has increased or a pointed position has moved (YES in either of steps S203 and S204), and the flow advances to step S205. On the other hand, in a case where the newest flag is "FALSE", the decision unit 123 decides that neither has the number of touches increased nor has a position moved (NO in steps S203 and S204), and the flow advances to step S207.

Figure 4:
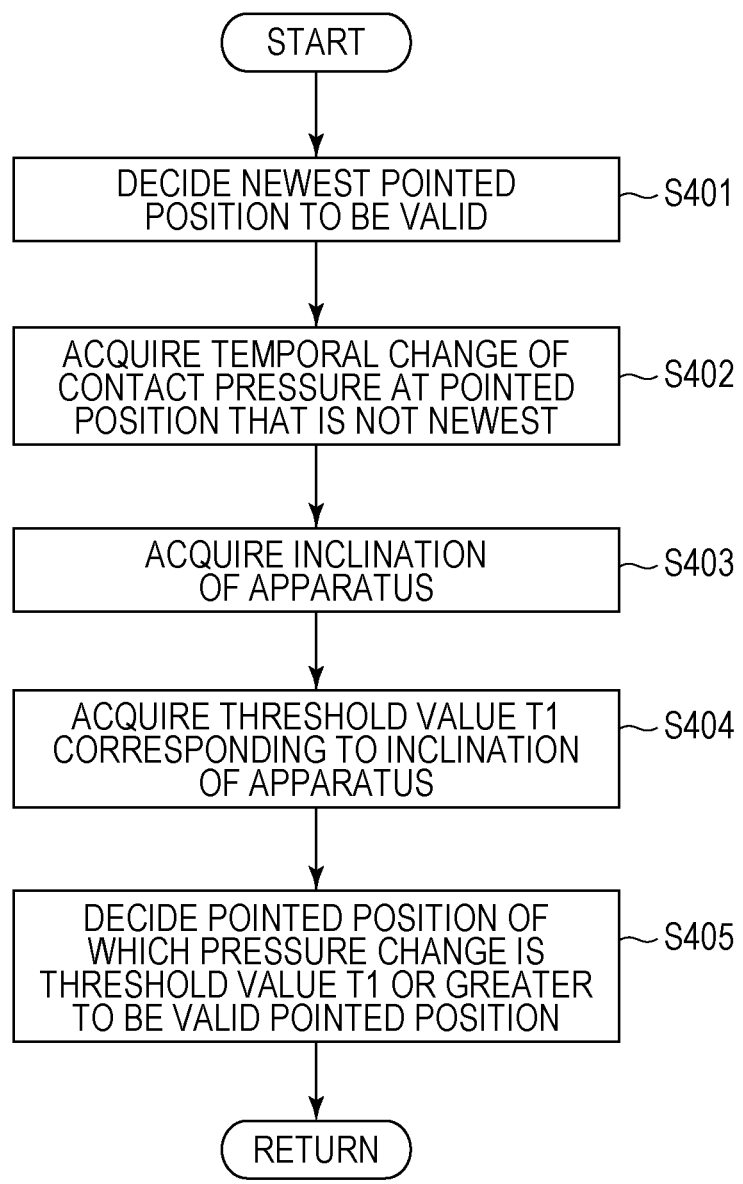
FIG. 4 is a flowchart illustrating an example of a flow of pointed position invalid determination processing, based on contact pressure of a pointed position.

In step S205, a decision is made for all pointed positions detected on the input region 102 at this point, regarding whether each is invalid as an input making up a touch operation. FIG. 4 is a flowchart illustrating the details of a flow of processing for deciding valid pointed positions based on the contact pressure corresponding to each pointed position, which is executed in step S205.

First, in step S401, the decision unit 123 decides, of all pointed positions, the newest pointed position to be valid. In the present embodiment, the decision unit 123 references the information held in the holding unit 127, and acquires the ID of the pointed position regarding which the newest flag is "TRUE". The decision unit 123 then sets the invalid flag correlated to the pointed position of the acquired ID to "FALSE".

In step S402, the pressure acquisition unit 122 acquires the temporal change of the contact pressure for all pointed positions which are not the newest. In the present embodiment, the pressure acquisition unit 122 first references the information held in the holding unit 127, and acquires all IDs of pointed positions of which the newest flag is "FALSE". The pressure acquisition unit 122 then acquires the pressure change, which is the temporal change of contact pressure, for the pointed positions regarding which the IDs have been acquired.

In step S403, the angle acquisition unit 126 acquires the inclination angle information of the information processing apparatus 100. In the present embodiment, the pressure acquisition unit 122 acquires the angle correlated with the pointed position acquired in step S201. Note that in a case where the inclination of the information processing apparatus 100 is not to be taken into consideration in the pointed position invalid determination processing, the processing of step S403 is unnecessary.

Figure 6A:
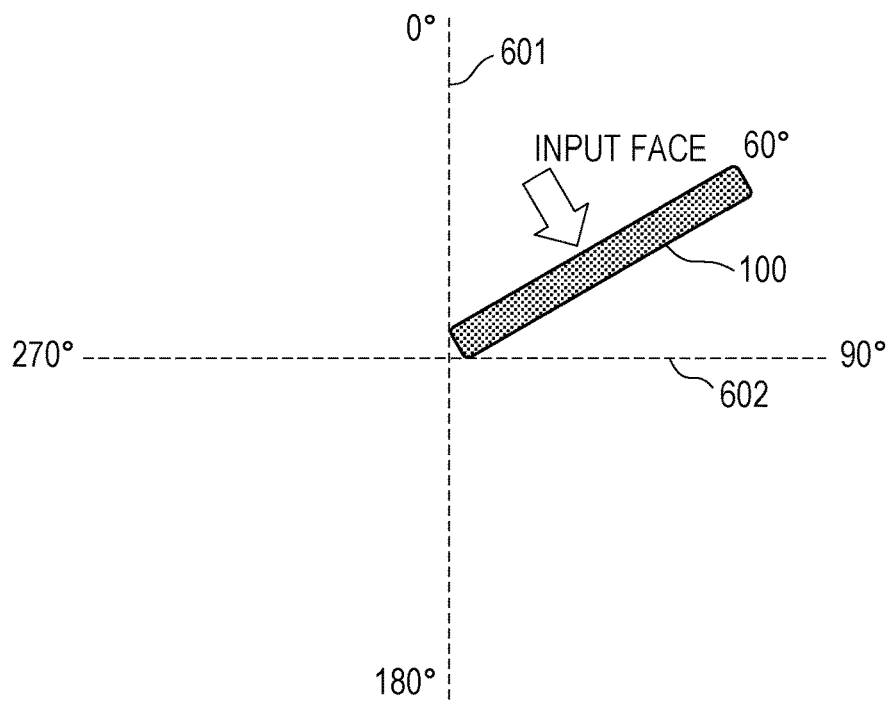
FIGS. 6A and 6B illustrate inclination of the information processing apparatus.

In step S404, the decision unit 123 acquires a threshold value T1 to be used in the pointed position invalid determination processing, based on the inclination of the information processing apparatus 100 acquired in step S403. This threshold value T1 is a pressure fluctuating range indicating the breadth of the tolerance limit of fluctuation of pressure at a pointed position from a hand supporting the information processing apparatus 100. The threshold value T1 is read out to the holding unit 127 beforehand. The pressure fluctuating range is generally registered as a numerical value, but may be registered as a percentage (e.g., 10% or the like) as to the detected contact pressure. Depending on the angle at which the information processing apparatus 100 is inclined, the magnitude of pressure applied to the information processing apparatus 100 by the hand supporting the device, and the breadth of fluctuation, will differ. Accordingly, the threshold value T1 is changed according to the state of inclination of the apparatus in the present embodiment, to improve determination accuracy. For example, in a case where the information processing apparatus 100 can be kept stable, the breadth of the pressure fluctuating range tolerated at the hand supporting the apparatus may be small. For example, in an angle range of 30 degrees to 150 degrees as illustrated in FIG. 6A, the threshold value T1 is preferably small. In the present embodiment, the decision unit 123 references the angle acquired in step S403, and acquires the threshold value T1 corresponding to the angle.

In step S405, the decision unit 123 decides a valid pointed position based on temporal change of contact pressure at the pointed position acquired in step S402. In the present embodiment, decision is made regarding whether or not the magnitude of pressure change at the pointed position acquired in step S402 exceeds the threshold value T1 acquired in step S404. Specifically, in a case where the magnitude of pressure change exceeds the threshold value T1, the decision unit 123 estimates this pointed position to be an operating point, and decides this to be a valid pointed position. On the other hand, in a case where the magnitude of pressure change is smaller than the threshold value T1, decision unit 123 estimates this pointed position to be a supporting point, and decides this to be an invalid pointed position. Now, in a case where the magnitude of pressure change is on the threshold value T1, whether to decide the pointed position to be valid or invalid can be selected at the time of setting the threshold value T1 beforehand. Here, processing is performed in the same way as if the magnitude of pressure change exceeds the threshold value T1. That is to say, in a case where the magnitude of pressure change is decided to be equal to or greater than the threshold value T1, the touch is decided to be valid, and "FALSE" is stored in the holding unit 127 for the invalid flag. On the other hand, in a case where the magnitude of pressure change is decided to be smaller than the threshold value T1 acquired in step S404, "TRUE" is held for the invalid flag. The flow then returns to the processing in FIG. 2.

Returning to the flow in FIG. 2, in the subsequent step S206 the recognizing unit 124 recognizes the input by the pointed position decided as being valid in step S205. In the present embodiment, the recognizing unit 124 references the holding unit 127 and recognizes all pointed positions of which the invalid flag is "FALSE" as input. The display controller 125 then controls images displayed on the touch panel display 115 based on the user input recognized by the recognizing unit 124. The flow of FIG. 2 then ends.

On the other hand, in step S207 the decision results regarding the pointed position are held. In the present embodiment, if the invalid flag is "TRUE" the holding unit 127 continues to hold "TRUE". On the other hand, in a case where the invalid flag is other than "TRUE", the holding unit 127 holds "FALSE".

While the present embodiment has been described as using a touch panel which notifies a touch event "TOUCH" if the touch sensor detects a touch, and "RELEASE" if a pointed position which had been detected is released, but the present disclosure is not restricted to this arrangement. For example, an arrangement may be made where, in a case where the input region 102 is touched anew, a "TOUCH_DOWN" is notified as a touch event, and if movement of the pointed position of an already-detected ID is detected, "MOVE" is notified, and if released, "TOUCH_UP" is notified. In this case, if "TOUCH_DOWN" is notified, information to be held in the holding unit 127 is newly added in correlation with an ID. In a case where "MOVE" is notified, the information correlated with the same ID is updated, and if "TOUCH_UP" is notified, the information correlated with the same ID is deleted. Thus, the information processing apparatus 100 manages multiple pointed positions detected at the touch panel, which is an input device, using IDs. Accordingly, movement of each of the multiple pointed positions can be detected, and accordingly multitouch operations made up of these pointed positions can be recognized.

In the above-described embodiment, the pressure fluctuation breadth is optimized by taking case of inclination of the information processing apparatus 100 during the pointed position invalid determination processing. However, user operation intent can be estimated and erroneous recognition reduced based on pressure change, even if the threshold value T1 is made to be constant regardless of the inclination of the information processing apparatus 100. In this case, setting the value of the threshold value T1 according to an attitude which is easiest for the user viewing the display screen to support the apparatus enables the user to be provided with a natural operational feeling.

Figure 5A:
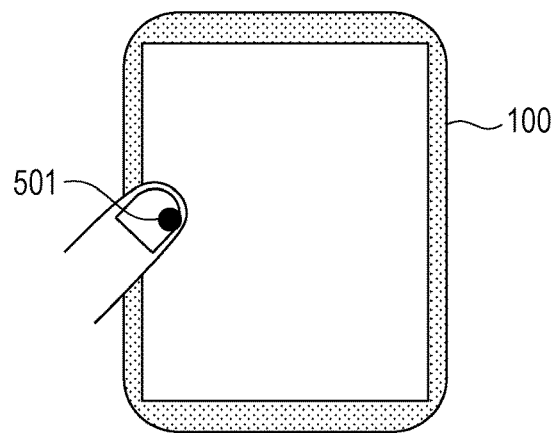
FIGS. 5A through 5C illustrate an example of operation of the information processing apparatus.
Figure 5B:
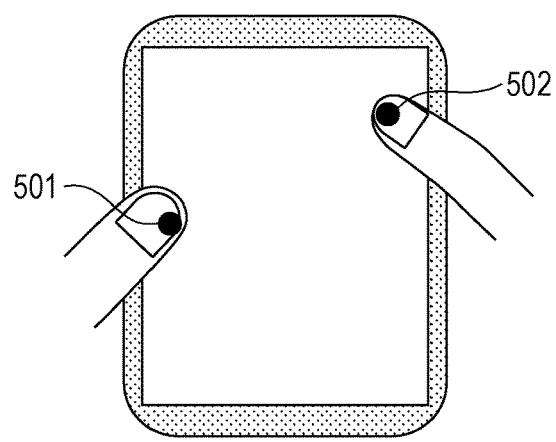
Figure 5C:
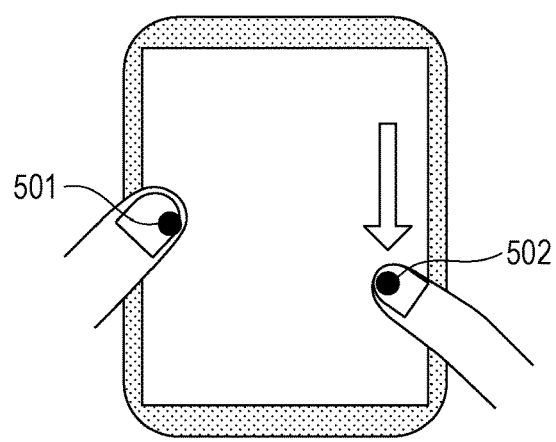
Figure 6B:
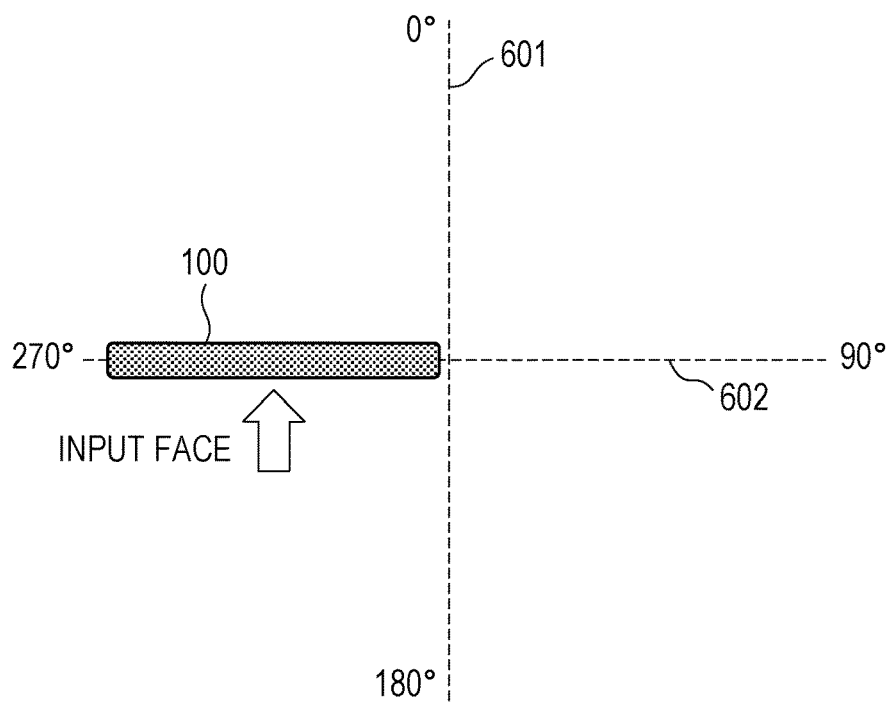

An example of the user operating the information processing apparatus 100 according to the present embodiment will be described with reference to FIGS. 5A through 6B. FIGS. 5A through 5C illustrate information processing apparatus 100 from the input region 102 side, in which user operations proceed in the order of FIG. 5A through 5C. FIGS. 6A and 6B are diagrams viewing the information processing apparatus 100 from the side, illustrating the angle at which the information processing apparatus 100 is being supported by the user using a vertical line 601 and horizontal line 602. As illustrated in FIGS. 6A and 6B, the angle of the apparatus is calculated clockwise from the reference vertical line 601, based on inclination information detected by the angle sensor 117. Accordingly, the vertical line 601 is 0 degrees, the horizontal line 602 is 90 degrees, the opposite of the vertical line 601 is 180 degrees, and the opposite of the horizontal line 602 is 270 degrees. FIG. 6A illustrates a state of a first operating example, where the angle of the information processing apparatus 100 supported by the user is 60 degrees. FIG. 6B illustrates a state of second and third operating examples, where the angle of the information processing apparatus 100 supported by the user is 270 degrees.

Figure 11A:
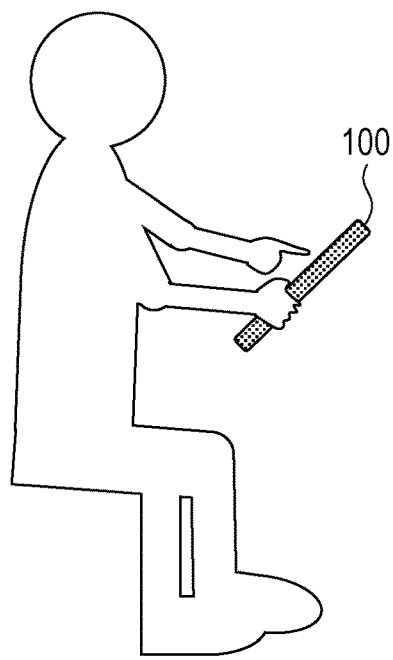
FIGS. 11A and 11B illustrate examples of postures of a user using the information processing apparatus.

First, the first operating example will be described with reference of FIGS. 5A through 5C and 6A. In this first operating example, the user is supporting the information processing apparatus 100 with the left hand at an angle at which the information processing apparatus 100 is easy to view, on a flat face such as on a desk, and operates the information processing apparatus 100 with the right hand. As illustrated in FIG. 6A, the angle at which the information processing apparatus 100 is supported by the user in a posture such as in FIG. 11A is 60 degrees. This angle remains the same through the operations by the user from FIGS. 5A through 5C. Assumption will be made here that the pressure fluctuation breadth (threshold value T1) in a case where the apparatus angle is 60 degrees, is 100.

First, FIG. 5A illustrates a state in which the user supports the information processing apparatus 100 in the left hand. At this time, upon the thumb of the left hand supporting the information processing apparatus 100 touching the input region 102, information of a pointed position 501 due to the thumb, such as position of the pointed position 501, ID, detection point-in-time, contact pressure, and so forth is acquired, and held (step S201). Now, a table 700 in FIG. 7 is a table illustrating an example of information held at this time. The items held here are the ID for identifying the pointed position, the X-Y coordinates of the pointed position and the point-in-time of detection thereof, the state of the newest flag indicating the newest pointed position, the contact pressure corresponding to the pointed position and the temporal variation, the angle of the information processing apparatus 100, and the invalid flag indicating that the pointed position is invalid as input. At the state of FIG. 5A, the ID is set to 1, and coordinates (50, 320), detection point-in-time of 0 ms, newest flag "TRUE", contact pressure of 900, contact pressure temporal change of 0, angle of 60 degrees, and invalid flag of "FALSE", are held. Note that in a case where the pointed position is detected for the first time (when the pointed position was undetected up until imme- diately before), the newest flag is constantly "TRUE", the temporal change of contact pressure is "0", and the invalid flag is "FALSE". The number of pointed positions detected here is one, so decision is made that the number of pointed positions is not multiple (NO in step S202), the invalid flag is maintained at "FALSE" (step S207), and the pointed position 501 is recognized as valid input information. Here, there is no change to display content in accordance with the recognized touch input, so the display screen is not changed (step S206). Hereinafter, description of the display controller 125 will be omitted when there is no change in display.

Next, FIG. 5B illustrates a state where operation of the information processing apparatus 100 is begun with the right hand, while still supporting the information processing apparatus 100 with the left hand. At this time, information of the pointed position 501 of the left hand in contact with the input region 102, and the pointed position 502 of the right hand, is newly detected. In the present embodiment, the touch sensor detects information of pointed positions one point at a time, even in the multi-touch state. In the case in FIG. 5B, the X-Y coordinates value of the pointed position 501 of the left hand is smaller, so notification from the touch sensor is made first. Accordingly, description of the processing performed regarding the pointed position 501 will be made first. Table 701 is a table illustrating an example of information held in the holding unit 127 when information of the pointed position 501 in FIG. 5B is obtained from the touch sensor periodically detecting the pointed position of the input region 102 (step S201). For this pointed position 501, the ID is 1, coordinates (50, 320), detection point-in-time 1000 ms, newest flag "FALSE", contact pressure 880, contact pressure temporal change |880−900|=20, angle 60 degrees, and invalid flag "FALSE". At the point that only the information of the pointed position 501 is notified, the number of pointed positions is recognized to be one point, and according a decision is made that the number of pointed positions is not multiple (NO in step S202). The invalid flag is maintained at "FALSE" (step S207), and the pointed position 501 is recognized as valid input information (step S206). Next, processing performed regarding the pointed position 502 at the right hand will be described. Table 702 in FIG. 7 illustrates an example of information held in the holding unit 127 when information of the pointed position 502 has been acquired from the touch sensor (step S201). The pointed position 502 is a newly-detected separate pointed position, so the ID is 2, and information of coordinates (430, 100), detection point-in-time 1010 ms, newest flag "TRUE", contact pressure 700, contact pressure temporal change 0, angle 60 degrees, and invalid flag "FALSE", is newly added. At this point, the number of detected pointed positions is two, a decision is made that the number of pointed positions is multiple (YES in step S202). The number of pointed positions has increased (YES in step S203), so processing to decide whether or not a valid pointed position is performed for all of the pointed position 501 and the pointed position 502 (Step S205). First, the pointed position 502 is the newest pointed position, so a decision is made that this is a valid pointed position, and the invalid flag is set to "FALSE" (step S401). With regard to the pointed position 501 which is not the newest, and information of contact pressure temporal change 20, and the inclination angle of 60 degrees of the information processing apparatus 100 are acquired (steps S402, S403), and threshold value T1=100 corresponding to the obtained inclination angle of 60 degrees is obtained (step S404). The temporal change of the obtained contact pressure is 20 and is smaller than the threshold value T1, so the pointed position 501 is determined to be invalid, and the invalid flag is set to "TRUE" (step S405). Consequently, only the pointed position 502 of which the invalid flag is "FALSE" is recognized as being valid input information (Step S206).

Next, FIG. 5C illustrates a state where operation of the information processing apparatus 100 is performed with the right hand, while still supporting the information processing apparatus 100 with the left hand. At this time, information of the pointed position 501 of the left hand in contact with the input region 102, and the pointed position 502 of the right hand, is newly detected. Table 703 in FIG. 7 is a table illustrating an example of information held regarding the pointed position 501. The ID is 1, coordinates (50, 320), detection point-in-time 2000 ms, newest flag "FALSE", contact pressure 850, contact pressure temporal change |850−880|=30, angle 60 degrees, and invalid flag "TRUE". At this point, the number of pointed positions detected is two points, so the number of pointed positions is decoded to be multiple (step S202), and the number of pointed positions has not increased (NO in step S203). Also, the pointed position 501 has not moved (NO in step S204), so the invalid flag is maintained at "TRUE" (step S207). Accordingly, only the pointed position 502 of which the invalid flag 502 is "FALSE" is recognized as valid input information (step S206). Next, processing performed regarding the pointed position 502 at the right hand will be described. Table 704 in FIG. 7 illustrates an example of information held regarding the pointed position 502. The ID is 2, and information of coordinates (430, 400), detection point-in-time 2010 ms, newest flag "TRUE", contact pressure 400, contact pressure temporal change |400−700|=300, angle 60 degrees, and invalid flag "FALSE", is held. The number of detected pointed positions is two, (YES in step S202), the number of pointed positions has not increased (NO in step S203), and the pointed position 502 has moved (YES in step S204). Accordingly, processing to decide whether or not a valid pointed position is performed for all of the pointed position 501 and the pointed position 502 (Step S205). First, the pointed position 502 is the newest pointed position, so a decision is made that this is a valid pointed position, and the invalid flag is set to "FALSE" (step S401). On the other hand, with regard to the pointed position 501 which is not the newest, information of contact pressure temporal change 30, and inclination the angle of 60 degrees of the information processing apparatus 100 are acquired (steps S402, S403), and threshold value T1=100 corresponding thereto is obtained (step S404). The temporal change of the obtained contact pressure is 30 and is smaller than the threshold value T1, so the pointed position is determined to be invalid, and the invalid flag is set to "TRUE" (step S405). Consequently, only the pointed position 502 of which the invalid flag is "FALSE" is recognized as being valid input information for a touch operation. The valid pointed position 502 has moved 300 dots in the positive direction of the Y axis, so the displayed image is controlled by the display controller 125 to scroll down in accordance with this operation (Step S206).

Figure 11B:
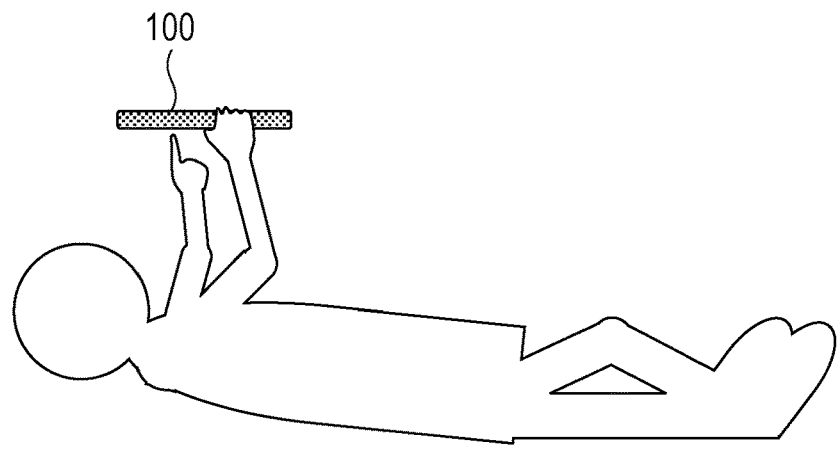

Next, a second operation example will be described with reference to FIGS. 5A through 5C and 6B. The difference as to the first operation example is that while the angle of the information processing apparatus 100 supported by the user is 60 degrees in the first operation example, this is 270 degrees in the second operation example. In the second operation example the user lying down supine, supporting the information processing apparatus 100 with the left hand at an angle at which the information processing apparatus 100 is easy to view, and operates the information processing apparatus 100 with the right hand. The posture of the user is such as illustrated in FIG. 11B. In this case, the pressing load on the pointed position at the hand supporting the apparatus is great as compared to that in FIG. 11A, and the angle of the apparatus tends to be unstable. As illustrated in FIG. 6B, the angle at which the information processing apparatus 100 is supported by the user is 270 degrees. This angle remains generally the same through the operations by the user from FIG. 5A through FIG. 5C. Assumption will be made here that the pressure fluctuation breadth (threshold value T1) in a case where the apparatus angle is 270 degrees, is 200.

Hereinafter, description which would be repetitive with that of the first operation example will be omitted. First, FIG. 5A illustrates a state in which the user supports the information processing apparatus 100 in the left hand. The pointed position 501 due to the thumb of the left hand supporting the information processing apparatus 100 is the only pointed position at this time, so in the same way as with the first operation example, the invalid flag is maintained at "FALSE" for the entire series of processes, and is recognized as input making up a touch operation. A table 800 in FIG. 8 is a table illustrating an example of information held at this time.

Next, FIG. 5B illustrates a state where operation of the information processing apparatus 100 is begun with the right hand, while still supporting the information processing apparatus 100 with the left hand. At this time, information of the pointed position 501 of the left hand in contact with the input region 102, and the pointed position 502 of the right hand, is newly detected. The processing regarding the pointed position 501 of the left hand is the same as with the first operation example. Table 801 is a table illustrating an example of information held when the pointed position 501 is detected. The ID is 1, coordinates (50, 320), detection point-in-time 1000 ms, newest flag "FALSE", contact pressure 1140, contact pressure temporal change |1140−1200|=60, angle 270 degrees, and invalid flag "FALSE". At the point that only the information of the pointed position 501 is notified from the touch sensor, the number of pointed positions is recognized to be one point, so the invalid flag is maintained at "FALSE", and the pointed position 501 is recognized as valid input information.

Next, Table 802 in illustrates an example of information acquired based on information notified regarding the pointed position 502 of the right hand. The ID is 2, and information of coordinates (430, 100), detection point-in-time 1010 ms, newest flag "TRUE", contact pressure 650, contact pressure temporal change 0, angle 270 degrees, and invalid flag "FALSE", is held. The number of detected pointed positions is multiple and has increased, so processing to decide whether or not the input of the pointed position 502 is valid, is performed for all of the pointed position 501 and the pointed position 502. Now, the pointed position 502 is the newest pointed position, so a decision is made that this is a valid pointed position, and the invalid flag is set to "FALSE". With regard to the pointed position 501 which is not the newest, threshold value T1=200 corresponding to the acquired inclination angle of 270 degrees is acquired based on the contact pressure temporal change 60 and inclination angle of 270 degrees of the information processing apparatus 100. The temporal change of the obtained contact pressure is 60 and is smaller than the threshold value T1, so the pointed position is determined to be invalid, and the invalid flag is set to "TRUE". Only the pointed position 502 of which the invalid flag is "FALSE" is recognized as being valid input information.

Next, FIG. 5C illustrates a state where operation of the information processing apparatus 100 is performed with the right hand, while still supporting the information processing apparatus 100 with the left hand. At this time, information of the pointed position 501 of the left hand in contact with the input region 102, and the pointed position 502 of the right hand, is newly detected. Table 803 is a table illustrating an example of information held regarding the pointed position 501 of the left hand. The ID is 1, coordinates (50, 320), detection point-in-time 2000 ms, newest flag "FALSE", contact pressure 1300, contact pressure temporal change |1300−1140|=160, angle 270 degrees, and invalid flag "TRUE". The newest flag is "FALSE", so the invalid flag is maintained at "TRUE", and only the pointed position 502 is recognized as an operation at this point as well.

Next, Table 804 illustrates an example of information held at the point that the information of the pointed position 502 is notified. The ID is 2, coordinates are (430, 400), and the newest flag is "TRUE", so invalid determination processing is performed for all of the pointed position 501 and the pointed position 502. First, the pointed position 502 is the newest pointed position, so a decision is made that this is a valid pointed position, and the invalid flag is set to "FALSE". With regard to the pointed position 501 which is not newest, information of contact pressure temporal change 160, and inclination the angle of 270 degrees of the information processing apparatus 100, and threshold value T1=200 corresponding to the obtained inclination angle of 270 degrees, are obtained. The temporal change of the contact pressure of the pointed position 501 is 160 and is smaller than the threshold value T1, so the pointed position 501 is determined to be invalid, and the invalid flag is set to "TRUE". Only the pointed position 502 of which the invalid flag is "FALSE" is recognized as being valid input information, and the pointed position 502 has moved 300 dots in the positive direction of the Y axis, so the displayed image is controlled to scroll down accordingly.

The weight of the information processing apparatus 100 is concentrated on the one finger in contact with the input face since the input face is facing downwards in the vertical direction in the second operation example, so the support becomes unstable as compared to the first operation example. The threshold value T1 is thus set to a greater value in the second operation example as compared with the first operation example, taking this inclination of support of the information processing apparatus 100 into consideration, thus enabling recognition of the scroll operation in the same way as with the first operation example.

As described above, according to the present embodiment, unintended operation of the information processing apparatus 100 capable of multi-touch operation due to the pointed position 501 which is a position where the user has touched the input region 102 to support the apparatus, being erroneously recognized as an input, can be avoided. The term "unintended operation" as used here means the apparatus performing an action different from that which the user intended, due to a single-touch operation by the pointed position 502 being erroneously recognized as a multi-touch operation as a result of the pointed position 501 being recognized. Examples include an intended scroll operation causing a displayed image to be enlarged or reduced instead. Judgment is made based on contact pressure of the pointed position and the breadth of temporal fluctuation in the present embodiment. Accordingly, unintended operations due to the hand holding the apparatus coming into contact with the touch panel can be reduced, while suppressing the influence of difference in pressing load on a pointed position due to individual differences in strength of the user, posture when operating the apparatus, and so forth. Accordingly, unintended operations when operating the information processing apparatus 100 can be reduced in various postures, such as lying supine as illustrated in FIG. 11B.

Further, the threshold value T1 can be set to more appropriate values by the difference in inclination of the supported information processing apparatus 100 being taken into consideration, thereby improving accuracy of decision. The pressure fluctuation breadth (threshold value T1) is a judgment reference to distinguish between a pointed position for supporting the apparatus and a pointed position for operating the apparatus. Accordingly, the threshold value T1 has to be an appropriate value that is not too large and not too small. The angle of the information processing apparatus 100 in the first operation example is such that the upper face in the vertical direction is the input face. In this state, the information processing apparatus 100 is supported in a stable state by at least the four fingers coming into contact with the face on the opposite side from the input face. Accordingly, the breadth of fluctuation according to the contact pressure of the pointed position 501 is small, so the threshold value T1 also is small. Further, a pointed position that is newly detected and a pointed position which has moved can be estimated to be due to user operations, so these can be decided to be valid pointed positions even without performing invalid determination processing based on contact pressure. Thus, processing efficiency can be improved without sacrificing decision accuracy.

Description has been made in the present embodiment that the newest pointed position of the multiple pointed positions detected at the same point-in-time (the pointed position detected last) is decided to be an input used for operation, regardless of pressure information. This is because when there are multiple pointed positions, which are touch positions or proximity positions, an operation for input is most likely performed after the apparatus has been supported, and thus the judgment processing based on pressure information has been omitted. That is to say, in a case where the user allocates the role of supporting the apparatus to one hand, and the role of operating the apparatus (or holding a stylus) to the other hand, the user will most likely first support the apparatus, and then touch or approach the display screen thereafter. Accordingly, abbreviating the invalid determination processing regarding the newest pointed position enables operations to be handled speedily. However, invalid determination processing to decide whether or not the newest pointed position is invalid may be performed based on the amount of change in pressure. This arrangement has advantages that unintended operations can be reduced even when the user is holding the apparatus in both hands or changes the supporting and operating hands.

Modification

The embodiment has been described as deciding a valid pointed position based on the fluctuation breadth of contact pressure as to one pointed position. Conversely, an example where a valid pointed position is decided based on pressure difference of contact pressure corresponding to multiple pointed positions will be described in the modification. This modification is advantageous in cases such as the user lies supine and performs touch operations on the display screen facing downwards, in which cases difference tends to occur in contact pressure between a pointed position to support the apparatus and a pointed position to operate the apparatus.

The external view and hardware configuration of the information processing apparatus 100 according to the modification is mostly the same as that illustrated in FIG. 1 regarding the above-described embodiment, so description thereof will be omitted. However, the functional configuration is different in that the pressure acquisition unit 122 of the modification acquires pressure difference based on the newest pointed position, and not on the temporal change of the contact pressure of the pointed position, and holds this for each pointed position in the holding unit 127. Also, the decision unit 123 performs the pointed position invalid determination processing based on pressure difference, and not on pressure fluctuation breadth. This modification may be carried out separately from the embodiment, or may be combined therewith.

Figure 9:
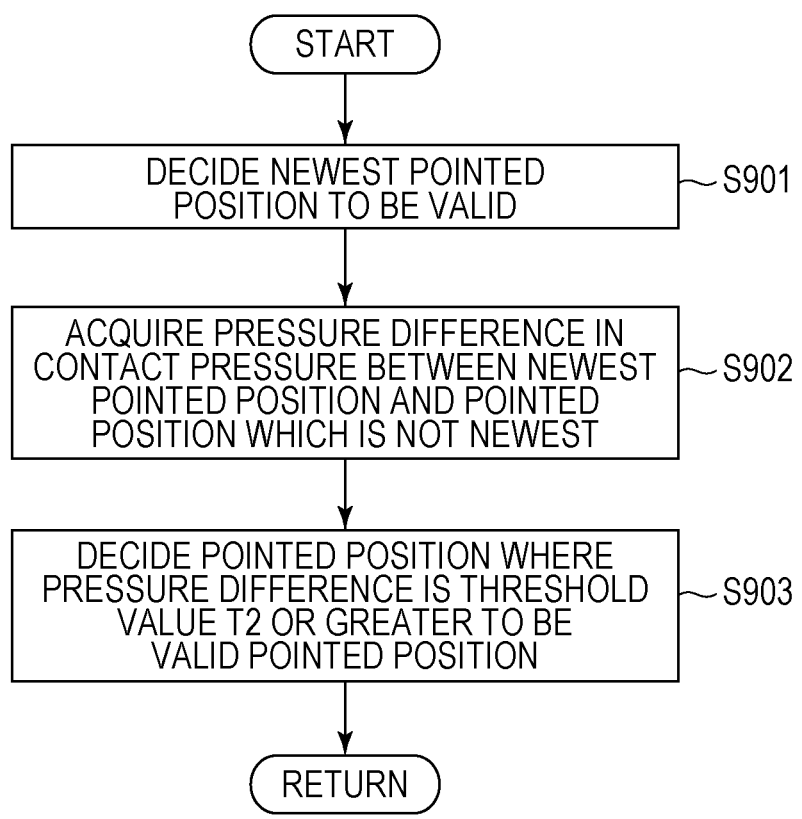
FIG. 9 is a flowchart illustrating an example of a flow of pointed position invalid determination processing, based on contact pressure of a pointed position.

In the modification as well, the information processing apparatus 100 performs touch input recognition following the flowcharts in FIGS. 2 and 3. The processing of the modification executed in step S205 differs, however. FIG. 9 is a flowchart which illustrates the flow of processing to decide a valid pointed position based on contact pressure of the pointed position according to the modification.

First, in step S901, the decision unit 123 decides the newest pointed position to be valid. In the modification, the decision unit 123 references information held in the holding unit 127 to acquire the ID for the pointed position regarding which the newest flag is "TRUE". The invalid flag correlated to the pointed position of the acquired ID is then set to "FALSE".

In step S902, the pressure acquisition unit 122 acquires the pressure difference between the newest pointed position and a pointed position which is not newest. In the modification, the pressure acquisition unit 122 references the holding unit 127, and acquires the pressure difference at a pointed position that is not newest (if there are multiple, at each), and the reference newest pointed position, based on the information of the contact pressure acquired in step S201.

In step S903, the decision unit 123 decides a valid pointed position based on the contact pressure of the pointed positions acquired in step S902. The decision method according to the modification takes note of the fact that the contact pressure greatly differs between a pointed position to support the apparatus and a pointed position to operate the apparatus, and uses this as a decision reference. Accordingly, a pointed position where the contact pressure difference as to the newest pointed position estimated to be an operating point and serving as a reference, is equal to or greater than a threshold value T2, is estimated to be a pointed position by the hand supporting the apparatus. Accordingly a decision is made that this pointed position is invalid as an operation input. The threshold value T2 is a value set beforehand as the minimum value of contact pressure difference between a touch by the hand supporting the apparatus and a touch by the hand to perform a touch operation. In the same way as with the threshold value T1 in the embodiment, the threshold value T2 may have several values prepared depending on the angle of the information processing apparatus 100 being supported. Also, an arrangement may be made where the processing of the modification is performed only in a case where the display screen has been tilted downwards by a certain angle or more, based on the detection results of the angle sensor 117, for example. The decision unit 123 sets the invalid flag to "TRUE" for a pointed position regarding which the contact pressure difference acquired in step S902 has been decided to be equal the threshold value T2 or greater, and sets the invalid flag to "FALSE" for a pointed position regarding which the pressure difference has been decided to be smaller than the threshold value T2. Note however, that in a case where the pressure difference is on the threshold value T2, whether to decide the pointed position to be valid or invalid can be selected at the time of setting the threshold value T1 beforehand. Upon the flow of the flowchart in FIG. 9 ending, the flow returns to the flowchart in FIG. 2.

Next, a third operation example, according to the modification, will be described with reference to FIGS. 5A through 5C and 6B. The third operation example assumes the user lying down supine, supporting the information processing apparatus 100 with the left hand at an angle at which the information processing apparatus 100 is easy to view, and operating the information processing apparatus 100 with the right hand. As illustrated in FIG. 6B, the angle at which the information processing apparatus 100 is supported by the user is 270 degrees. This angle remains the same through the operations by the user from FIG. 5A through FIG. 5C. Assumption will be made in the third operation example that the pressure difference threshold value T2 is 200.

First, FIG. 5A illustrates a state in which the user supports the information processing apparatus 100 in the left hand. At this time, upon the thumb of the left hand supporting the information processing apparatus 100 touching the input region 102, information of the pointed position 501 is notified by the touch sensor and held in the holding unit 127 (step S201). Now, a table 1000 in FIG. 10 is a table illustrating an example of information held with regard to the processing on the pointed position 501. The difference between FIG. 10 and FIGS. 7 and 8 is that there is an item of contact pressure difference, of which the reference is the newest pointed position (pointed position where the newest flag is "TRUE"). This contact pressure difference is only acquired and held when multiple pointed positions have been detected. Accordingly, in Table 1000, the ID is set to 1, and coordinates (50, 320), detection point-in-time of 0 ms, newest flag "TRUE", contact pressure of 1200, and invalid flag of "FALSE", are held. The number of pointed positions detected here is one (NO in step S202), the invalid flag is maintained at "FALSE" (step S207), and the pointed position 501 is recognized as valid input information (step S206).

Next, FIG. 5B illustrates a state where operation of the information processing apparatus 100 is begun with the right hand, while still supporting the information processing apparatus 100 with the left hand. At this time, information of the pointed position 501 of the left hand in contact with the input region 102, and the pointed position 502 of the right hand, is newly detected. Table 1001 is a table illustrating an example of information held when information of the pointed position 501 acquired. The ID is 1, coordinates (50, 320), detection point-in-time 1000 ms, newest flag "FALSE", contact pressure 1150, and invalid flag "FALSE". The number of detected pointed positions here is one point (NO in step S202), so the invalid flag is maintained at "FALSE" (step S207), and the pointed position 501 is recognized as valid input information (step S206). Next, Table 1002 illustrates an example of information held when information of the pointed position 502 has been acquired. The ID is 2, and information of coordinates (430, 100), detection point-in-time 1010 ms, newest flag "TRUE", contact pressure 700, and invalid flag "FALSE", is held. At this point, the number of detected pointed positions is multiple, so the contact pressure corresponding to the pointed position 502 regarding which the newest flag is "TRUE" becomes the reference, and pressure difference as to the magnitude of contact pressure acquired regarding other pointed positions is added to the information correlated with each of the pointed positions. In the case of the table 1002, pressure difference 450 is held for the information of the pointed position 501 of which the ID is 1. At this stage, the number of pointed positions is two which is multiple (YES in step S202), and the number of pointed positions has increased (YES in step S203), so processing to decide whether or not a valid pointed position is performed for all of the pointed position 501 and the pointed position 502 (Step S205). First, the pointed position 502 is the newest pointed position, so a decision is made that this is a valid pointed position, and the invalid flag is set to "FALSE" (step S901). The pointed position 502 of which the newest flag is "TRUE" is used as a reference to acquire the contact pressure difference as to the pointed position 501 of which the newest flag is "FALSE" (step S902). The decision unit 123 then acquires the threshold value T2=200, and since the contact pressure difference of the pointed position 501 is 450 which is equal to or greater than threshold value T2, the pointed position 501 is decided to be invalid and the invalid flag is set to "TRUE" (step S903). The recognizing unit 124 then recognizes the pointed position 502 of which the invalid flag is "FALSE" to be valid input information (Step S206).

Next, FIG. 5C illustrates a state where operation of the information processing apparatus 100 is performed with the right hand, while still supporting the information processing apparatus 100 with the left hand. At this time, information of the pointed position 501 of the left hand in contact with the input region 102, and the pointed position 502 of the right hand, is newly detected. Table 1003 is a table illustrating an example of information held regarding information of the pointed position 501 having been acquired. The ID is 1, coordinates (50, 320), detection point-in-time 2000 ms, newest flag "FALSE", contact pressure 1300, contact pressure temporal change |1300−700|=600, and invalid flag "TRUE". Next, the number of pointed positions detected is two points, so the number of pointed positions is decoded to be multiple (YES in step S202), and the pointed position 501 has not moved (NO in step S204), so the invalid flag is maintained at "FALSE" (step S207). Accordingly, the pointed position 502 of which the invalid flag 502 is "FALSE" is recognized as valid input information (step S206). Next, Table 1004 illustrates an example of information held regarding in accordance with information of the pointed position 502 having been acquired. The ID is 2, and information of coordinates (430, 400), detection point-in-time 2010 ms, newest flag "TRUE", contact pressure 400, and invalid flag "FALSE", is held. Further, the contact pressure difference |1300−400|=900 as to the reference pointed position of which the newest flag is "TRUE", is added to the information held regarding the pointed position 501 of which the ID is 1. The pointed position 502 has moved (YES in step S204), so processing to decide whether or not a valid pointed position is performed for all of the pointed position 501 and the pointed position 502 (Step S205). First, the pointed position 502 is the newest pointed position, so a decision is made that this is a valid pointed position, and the invalid flag is set to "FALSE" (step S901). The contact pressure difference is referenced and acquired regarding the pointed position 501 of which the newest flag is not "TRUE" (step S902). At this stage, the contact pressure difference is 900 which is equal to or greater than the threshold value T2 of 200, so the pointed position is determined to be invalid, and the invalid flag is set to "TRUE" (step S904). The pointed position 502 of which the invalid flag is "FALSE" is recognized as being valid input information. The pointed position 502 has moved 300 dots in the positive direction of the Y axis, so the displayed image is controlled by the display controller 125 to scroll down in accordance with this operation (Step S206).

As illustrated in the third operation example, in a case where the information processing apparatus 100 is supported at an angle with the display screen facing downwards, the weight of the information processing apparatus 100 is concentrated on the one finger in contact with the input face, so the support becomes unstable. The fluctuation breadth of contact pressure of the pointed position 501 of the hand supporting the information processing apparatus 100 tends to be great, so the decision accuracy can be improved by using the pressure difference at multiple pointed positions instead of (or in combination with) fluctuation breadth, as in the modification.

Description has also been made in the modification that the invalid determination processing is omitted for the newest pointed position, since an operation for input is most likely performed after the apparatus has been supported, but the present disclosure is not restricted thusly. However, a pointed position to serve as a reference for pressure difference needs to be identified for invalid determination processing using pressure difference. Processing based on pressure difference can be performed regarding the newest pointed position as well, by acquiring pressure difference with a pointed position already decided to be invalid or valid as a reference, and thus judgment can be made based on the difference in pressure between the hand supporting the apparatus and the hand operating the apparatus. This arrangement has advantages that unintended operations can be reduced even when the user is holding the apparatus in both hands or changes the supporting and operating hands.

The present disclosure is realized by executing the following processing. That is to say, software (program) realizing the functions of the above-described embodiment is supplied to a system or apparatus via a network or various types of recording media, and a computer (or CPU or microprocessor unit (MPU) or the like) of the system or apparatus reads out and executes the program.

According to the embodiment as described above, unintentional operations of an apparatus capable of multi-touch operations due to a touch made by the hand of the user holding the apparatus can be reduced, even in cases where there are differences in individual users, and in the inclination of the touch input device when operating.

Other Embodiments

Embodiments of the present disclosure can also be realized by a computer of a system or apparatus that reads out and executes computer executable instructions recorded on a storage medium (e.g., a non-transitory computer-readable storage medium) to perform the functions of one or more of the above-described embodiment(s) of the present disclosure, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of priority from Japanese Patent Application No. 2013-261506, filed Dec. 18, 2013, which is hereby incorporated by reference herein in its entirety.

What is claimed is:

1. An information processing apparatus which recognizes an operation input using pointing, the apparatus comprising:
a position acquisition unit configured to acquire at least one pointed position pointed on a display screen;
a pressure acquisition unit configured to acquire information related to pressure corresponding to each of the at least one pointed positions acquired by the position acquisition unit;
a determination unit configured to, in a case where there are plural pointed positions pointed on the display screen, determine a newest pointed position as making up an input used for an operation of the information processing apparatus, and
determine whether each of pointed positions that are not the newest point position makes up the input used for the operation of the information processing apparatus or not on a basis of a pressure difference between a pressure at the newest pointed position serving as a reference and a pressure at each of the pointed positions that are not the newest point position; and
a recognition unit configured to recognize the operation input, said recognition being made
by using the newest pointed position, and
by using, among the pointed positions that are not the newest point position, a pointed position determined on the basis of the pressure difference by the determination unit as making up the input used for the operation of the information processing apparatus, and
not by using, among the pointed positions that are not the newest point position, a pointed position determined on the basis of the pressure difference by the determination unit as not making up the input used for the operation of the pressure difference by the determination unit as not making up the input used for the operation of the information processing apparatus.

2. The information processing apparatus according to claim 1,
wherein the pressure acquisition unit acquires an amount of change of pressure over a predetermined amount of time, corresponding to each pointed position acquired by the position acquisition unit,
and wherein a decision unit decides, regarding the plurality of pointed positions, whether each pointed position make up input used for an operation of the information processing apparatus, based on information relating to the amount of change of pressure acquired by the pressure acquisition unit.

3. The information processing apparatus according to claim 2,
wherein the decision unit decides that, of the plurality of pointed positions, a pointed position regarding which the amount of change of pressure acquired by the pressure acquisition unit does not exceed a predetermined value, as not making up input used for an operation of the information processing apparatus.

4. The information processing apparatus according to claim 3, further comprising:
an angle acquisition unit configured to detect angle information corresponding to an inclination of the information processing apparatus,
wherein the decision unit selects the predetermined value based on angle information acquired by the angle acquisition unit.

5. The information processing apparatus according to claim 1,
wherein a decision unit decides that of the plurality of pointed positions a pointed position regarding which pressure difference as to the pointed position serving as a reference, obtained by the pressure acquisition unit, exceeds a predetermined value, does not make up input used for an operation of the information processing apparatus.

6. The information processing apparatus according to claim 5,
wherein the newest pointed position is either of a pointed position acquired last when a number of pointed positions acquired by the position acquisition unit increases, and a pointed position acquired by the position acquisition unit which has moved last.

7. The information processing apparatus according to claim 1,
wherein each pointed position is a touch position detected in response to the display screen having been touched,
and wherein the pressure acquisition unit acquires a value representing a magnitude of pressure applied to each touch position acquired by the position acquisition unit.

8. The information processing apparatus according to claim 1,
wherein the pressure acquisition unit acquires a value representing a magnitude of contact pressure applied to each pointed position acquired by the position acquisition unit.

9. The information processing apparatus according to claim 8,
wherein the pressure acquisition unit deems a contact area size detected at each touch position, acquired by the position acquisition unit, to be a value representing the magnitude of contact pressure applied to each pointed position.

10. A control method of an information processing apparatus which recognizes an operation input using pointing, the method comprising:
first acquiring, of at least one pointed position pointed on a display screen;
second acquiring, of information related to pressure corresponding to each of the at least one pointed positions acquired in the first acquiring;
determining, in a case where there are plural pointed positions pointed on the display screen, a newest pointed position as making up an input used for an operation of the information processing apparatus, and determining whether each of pointed positions that are not the newest point position makes up the input used for the operation of the information processing apparatus or not on a basis of a pressure difference between a pressure at the newest pointed position serving as a reference and a pressure at each of the pointed positions that are not the newest point position; and
recognizing the operation input, said recognition being made by using the newest pointed position, and by using, among the pointed positions that are not the newest point position, a pointed position determined on the basis of the pressure difference by the determination unit as making up the input used for the operation of the information processing apparatus, and not by using, among the pointed positions that are not the newest point position, a pointed position determined on the basis of the pressure difference by the determination unit as not making up the input used for the operation of the pressure difference by the determination unit as not making up the input used for the operation of the information processing apparatus.

11. A non-transitory storage medium storing a program causing a computer to execute a control method of an information processing apparatus which recognizes an operation input using pointing, the method comprising:

first acquiring, of at least one pointed position pointed on a display screen;

second acquiring, of information related to pressure corresponding to each of the at least one pointed positions acquired in the first acquiring;

determining, in a case where there are plural pointed positions pointed on the display screen, a newest pointed position as making up an input used for an operation of the information processing apparatus, and determining whether each of pointed positions that are not the newest point position makes up the input used for the operation of the information processing apparatus or not on a basis of a pressure difference between a pressure at the newest pointed position serving as a reference and a pressure at each of the pointed positions that are not the newest point position; and recognizing the operation input, said recognition being made by using the newest pointed position, and by using, among the pointed positions that are not the newest point position, a pointed position determined on the basis of the pressure difference by the determination unit as making up the input used for the operation of the information processing apparatus, and not by using, among the pointed positions that are not the newest point position, a pointed position determined on the basis of the pressure difference by the determination unit as not making up the input used for the operation of the pressure difference by the determination unit as not making up the input used for the operation of the information processing apparatus.

* * * * *